United States Patent [19]

Storz

[11] Patent Number: 4,485,902
[45] Date of Patent: Dec. 4, 1984

[54] RECYCLING ARRANGEMENT FOR A HYDRAULIC COUPLING

[75] Inventor: Werner Storz, Benningen, Fed. Rep. of Germany

[73] Assignee: Suddeutsche Kuhlerfabrik Julius Fr. Behr GmbH & Co. KG, Fed. Rep. of Germany

[21] Appl. No.: 319,079

[22] Filed: Nov. 6, 1981

[30] Foreign Application Priority Data

Nov. 6, 1980 [DE] Fed. Rep. of Germany ....... 3041829

[51] Int. Cl.³ ...................... F16D 35/00; F16D 33/10
[52] U.S. Cl. .................................. 192/58 B; 192/82 T
[58] Field of Search ............................. 192/58 B, 82 T

[56] References Cited

U.S. PATENT DOCUMENTS

| Re. 30,608 | 5/1981 | Bopp ................................ | 192/58 B |
| 2,792,095 | 5/1957 | Sherman ........................... | 192/58 B |
| 3,194,372 | 7/1965 | Weir ................................. | 192/58 B |
| 3,559,785 | 2/1971 | Weir ................................. | 192/58 B |
| 3,840,101 | 10/1974 | Peter et al. ....................... | 192/58 B |
| 3,943,893 | 3/1976 | Tsubaki et al. ................. | 192/58 B X |
| 3,972,399 | 8/1976 | Bopp ................................ | 192/58 B |
| 3,983,980 | 10/1976 | Weintz ............................. | 192/58 B |
| 4,036,339 | 7/1977 | Kikuchi ........................... | 192/58 B |
| 4,086,989 | 5/1978 | Spence ............................. | 192/58 B |
| 4,086,990 | 5/1978 | Spence ............................. | 192/58 B |
| 4,116,318 | 9/1978 | Crisenbery et al. ............. | 192/58 B |
| 4,133,417 | 1/1979 | Glasson et al. .................. | 192/58 B |
| 4,266,645 | 5/1981 | Crooks ............................. | 192/58 B |
| 4,317,510 | 3/1982 | Staub, Jr. ......................... | 192/58 B X |

FOREIGN PATENT DOCUMENTS 482583 1/1976 U.S.S.R. ............................ 192/58 B

Primary Examiner—Rodney H. Bonck
Assistant Examiner—David D. House
Attorney, Agent, or Firm—Craig and Burns

[57] ABSTRACT

A hydraulic coupling which includes a primary coupling part having a pot-shaped pulley or sheave, and a secondary coupling part including a housing provided with a cover. The primary and secondary parts are supported relative to one another in such a manner that they can rotate and the pot-shaped pulley or sheave is located in a working compartment formed in the housing. The working compartment is connected by way of a recycling arrangement, including a bore in the cover, to a supply channel to enable a recycling of the coupling fluid. A circumferential surface of the pulley or sheave is provided with spiral or thread-like grooves. At least one baffle or dam body is provided in order to pump off the coupling fluid from the working compartment. The housing is provided, in an interior thereof, with a circumferentially extending channel having an axial length or width when extends over a portion of a depth or axial length of the pulley or sheave. The channel terminates in an end wall, nearest the cover, in a radial plane in which a forward edge of the pulley or sheave is disposed. The dam or baffle body is located in a recess in the housing in such a manner that a radially inner surface of the body is disposed along a cylindrical inner surface of the housing and extends in an axial direction from an area above the supply chamber to a point above the circumferentially extending channel.

20 Claims, 5 Drawing Figures

RECYCLING ARRANGEMENT FOR A HYDRAULIC COUPLING

The present invention relates to a coupling arrangement and, more particularly, to a hydraulic coupling which includes a primary coupling part and a secondary coupling part, with the primary coupling part being formed as a pot-shaped pulley or sheave and the secondary coupling part being formed by a housing and a cover. The primary and secondary coupling parts are mounted or supported so as to rotate and the pulley or sheave is disposed in a working chamber formed in the housing. The working chamber is connected through a return opening in the cover with a supply or feed chamber formed in the secondary coupling part for enabling a re-cycling of the coupling fluid. Winding or spiral thread-like grooves are provided on an outer circumferential surface of th pulley, and at least one baffle or damming means is provided to enable a draining or pumping off of fluid from the working chamber.

Hydraulic couplings of the aforementioned type have been proposed and, in order to enable a transmission of as large a torque as possible, generally, pot-shaped sheaves or pulleys have been provided which include outer circumferential surfaces having an approprite width and extending in an axial direction of the sheave or pulley. A gap is provided between the pulley and an inner circumferential surface of the housing, in which gap a highly viscous coupling fluid causes the rotation of the sheave or pulley to be transmitted to the housing. Depending on the amount of volume of the highly viscous fluid in the working chamber, it is possible to transmit torques of a greater or lesser magnitude.

In order to be able to regulate or control the quantity of coupling fluid, the proposed hydraulic couplings are provided with a feed or supply chamber which is connected to the working chamber by an inlet opening means and a return means and, with these types of constructions, the coupling fluid may be fed from the supply chamber into the working chamber with, for example, a temperature regulation. The fluid is returned in a circumferential area of the pulley since, during a rotation of the hydraulic coupling, the fluid will be in this boundary area due to the occurrence of centrifugal forces. In order to enable a pumping out or draining out of the coupling fluid, baffle or dam bodies or members are provided in the boundary areas which stop a motion of rotation of the coupling fluid and allow the coupling fluid to flow back into the feed chamber through a return channel.

In, for example, German Pat. No. 1,450.113, a hydraulic coupling is proposed wherein two baffle or damming elements are secured to a flange portion of a forward part of the housing, with the elements extending into the working chamber and damming the coupling fluid in front of two channels through which the coupling fluid is then conveyed to the supply or feed chamber.

Since a distance between the baffle or damming element secured at the foward part of the housing or cover on the housing and the sheave or pulley essentially determines what proportion of the coupling fluid may be conveyed from the working chamber into the feed chamber, a disadvantage of the proposed hydraulic couplings resides in the fact that if the distance is relatively large, a larger portion of the coupling fluid may remain in the working chamber thereby making it impossible to obtain a complete disengagement of the hydraulic coupling.

While it has been proposed to shorten the distance or make the distance as small as possible by, for example, having the baffle or damming element extend as far as the surface of the sheave or pulley, a disadvantage of this proposal resides in the fact that this proposed solution results in the creation of friction forces between the sheave or pulley and the baffle or damming element thereby resulting in undue wear and tear on the element.

In order to ensure a reliable operation of the hydraulic coupling, not only must very narrow tolerance limits be observed in order to regulate a distance between the baffle or damming element and the sheave or pulley so as to minimize the wear and tear phenomena, but also tolerance limits must be observed in order to be certain that an excessive gap is not provided between sheave or pulley and the baffle or damming element since otherwise the operability of the hydraulic coupling would be impaired. As can readily be appreciated, the requirement or necessity for very narrow tolerance margins raises additional problems and, in turn, the overall manufacturing costs of the hydraulic coupling.

The aim underlying the present invention essentially resides in providing a hydraulic coupling which may be manufactured without observing narrow tolerance limits and which operates without wear and tear, while nevertheless ensuring that the coupling fluid may be completely pumped or drained from the working chamber into a feed or supply chamber of the hydraulic coupling.

In accordance with advantageous features of the present invention, a main body portion forming a housing is provided, on an inside thereof, with a channel extending a circumferential direction. The channel, in an axial direction, extends over a portion of a depth of the pot-shaped pulley or sheave in a direction toward the cover on the housing. The channel terminates in a radial plane at a forward edge of the sheave or pulley, with the baffle or damming element being accommodated in a recess in the housing in such a manner that a surface of the element facing radially inwardly lies along an inner cylinder surface of the housing and extends in an axial direction from an area above the supply chamber to a point above the channel.

A significant advantage of the hydraulic coupling constructed in accordance with the present invention resides in the fact that the coupling fluid from the dam element or body is stopped or dammed inside the channel provided at the interior of the housing and, due to the rotation of the pulley or sheave, the coupling fluid between the outer circumferential surface of the pulley or sheave and an inner surface of the housing is conveyed through a spiral or winding groove arrangement on the outer circumferential surface of the pulley or sheave into an area over which the channel extends.

Due to the centrifugal forces occasioned by the rotation of the pulley or sheave, the coupling fluid moves into the channel, is trapped by the baffle or dam body retarding the rotational motion of the coupling fluid, and the fluid is then fed through a return means in the cover of the housing to the supply or feed chamber. Thus, in the construction of the present invention, the baffle or dam body no longer cooperates directly with a face of the sheave or pulley and, consequently, considerably larger tolerances with respect to a distance between the cover and the face of the sheave or pulley may be allowed without impairing the operability of the hydraulic coupling.

In accordance with further features of the present invention, the baffle or dam body may be constructed in such a manner so as to enable the body to be inserted into the recess formed in the main body or housing so that a portion of the body extends over the channel.

Advantageously, the baffle or dam body is, in accordance with the present invention, provided with a return bore or channel which communicates with the return means in the cover. A recess is provided in the baffle or dam body, with such recess forming a dam chamber for the coupling fluid. The recess forming the dam chamber is disposed in an area of the dam or baffle body which faces radially inward. The recess may, for example, be formed as a diagonal channel.

Advantageously, the return bore or channel communicating with the return means of the cover terminates at a radially inner end through an opening disposed in an area of the return means of the cover, when the dam or baffle body is in a secured or mounted position. Thus, the working fluid is dammed up in a rear area of the dam or baffle body and is conveyed radially inwardly in such a manner that it flows back through the return means in the cover into the supply chamber through the opening of the return channel or bore.

With the recess forming the damming chamber being constructed as a diagonal channel, working fluid is reliably branched from the channel in the housing and directed into the diagonal channel into an area of a mouth of the return bore where it is dammed up and then directed through the return bore by way of the return means in the cover to the supply chamber. A dam or baffle body shaped in this manner simultaneously performs the function of damming and recycling the working fluid.

Advantageously, a radial width of the dam or baffle body and recess accommodating the dam or baffle body is constructed so as to correspond to a radial depth of the channel in the housing. A radial out wall of the recess is advantageously disposed in the same plane as a radially outer wall of the annular channel so as to enable a smooth insertion surface and the possibility of shaping the dam or baffle body in the same manner.

The dam or baffle body may be fashioned, for example, by injection molding from, for example, a plastic material, so that the recess forming the damming chamber and the bore in the dam or baffle body need not be manufactured separately, thereby resulting in a simple and low cost construction. The use of plastic as a material for forming the dam or baffle body is made possible, in particular, because friction no longer develops between the pulley or sheave and surfaces of the dam body and, consequently, the dam or baffle body may operate with absolutely no wear and tear.

Accordingly, it is an object of the present invention to provide a hydraulic coupling which avoids, by simple means, shortcomings and disadvantages encountered in the prior art.

Another object of the present invention resides in providing a hydraulic coupling which is simple in construction and therefore relatively inexpensive to manufacture.

Another object of the present invention resides in providing a hydraulic coupling which ensures the occurrence of a complete disengagement of the coupling.

A further object of the present invention resides in providing a hydraulic coupling which may readily be manufactured without the need for close tolerances.

A still further object of the present invention resides in providing a hydraulic coupling which minimizes wear and tear of elements thereof.

Yet another object of the present invention resides in providing a hydraulic coupling which is readily capable of transmitting large as well as small torque.

These and other objects, features, and advantages of the present invention will become more apparent from the following description when taken in connection with the accompanying drawing which shows, for the purposes of illustration only, two embodiments in accordance with the present invention, and wherein.

Figure 1:
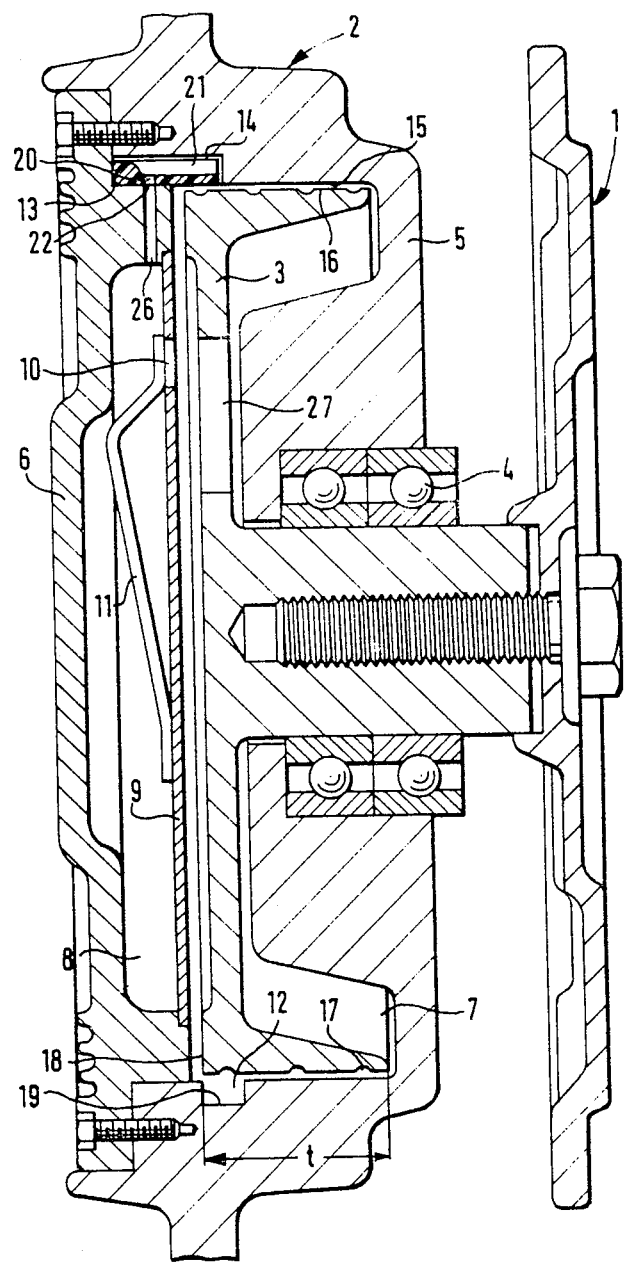
FIG. 1 is a partially schematic cross sectional view of a hydraulic coupling constructed in accordance with the present invention.

Referrring now to the drawings wherein like reference numerals are used throughout the various views to designate like parts and, more particulaly, to FIG. 1, according to this figure, the hydraulic coupling includes a primary coupling part generally designated by the reference numeral 1 and a secondary coupling part generally designated by the reference numeral 2, with the primary coupling part 1 including a pot-shaped sheave or pulley 3 rotatably mounted or supported by a bearing 4 in a housing 5 formed in the secondary coupling part 2. A cover 6 is secured to the housing 5 so as to seal the same, with a partition or dividing wall 9 separating an interior of the housing 5 into a supply or feed chamber 8 and a working chamber 7. Coupling fluid remains in the supply or feed chamber 8 until a control element 11 opens an inlet opening 10 communicating the supply and working chambers, 7, 8 with each other. The schematically illustrated control element 11 is of a conventional construction and, for example, may be actuated as a function of temperature. When the control element 11 opens the inlet opening 10, the coupling fluid may flow into the working chamber 7 through openings 27 provided in the sheave or pulley 3. When the sheave or pulley 3 rotates, centrifugal forces cause the coupling fluid to be distributed in outer circumferential boundary areas of the working chamber 7 so that the coupling fluid flows between a circumferential surface 16 of the sleeve or pulley 3 and an inner surface 15 of the housing 5 thereby causing an entrainment or coupling effect in dependence upon a quantity of coupling fluid in the working chamber 7.

In order to enable the coupling fluid to flow out of the working chamber 7 and back into the supply chamber 8, spiral or wound grooves 17 are provided along the outer circumferential surface 16 of the pulley or sheave 3 for directing the working fluid along the circumferential outer surface 16 toward the cover 6.

The housing 5 is provided in an interior thereof with a circumferential channel 12 having an axial length or width sufficient to extend over at least a portion of a depth t of the sheave or pulley 3. A side edge of the channel 12 facing the cover 6 is constructed and arranged such that it ends in a vertical plane in which a forward edge 18 of the pulley or sheave 3 is disposed; therefore, the coupling fluid is conveyed through the grooves 17 on the outer circumferential surface 16 of the pulley or sheave 3 toward the cover 6 until the coupling fluid enters the channel 12. Because of the centrifugal force, the coupling fluid will be adjacent a radial outside wall 19 of the channel 12 at that point and continue the motion of rotation imparted to the coupling fluid due to the centrifugal force.

A recess 14 is provided in the housing 5 for accommodating a damming or baffle body 13, with the body 13 being constructed so as to enable it to be inserted into the recess 14 in contact with the channel 12. An end of the body 13 extends in an axial direction toward the primary coupling part 1 thereby causing coupling fluid to be dammed or stopped thereat. A recess 21 is formed in the body 13, with the recess 21 forming a damming chamber and a bore 20 is provided which communicates with the recess 21. A radially inward end or opening 22 of the bore 20 terminates above a return bore 26 formed in the cover 6, with the return bore 26 communicating with the feed chamber 8, whereby coupling fluid from the damming chamber may flow through the bore 20 and return bore 26 into the feed chamber 8.

A significant advantage of the hydraulic coupling having the above noted constructional features resides in the fact that a distance, which is critical in previously proposed constructions, between the baffle or dam body 13 mounted at a forward part of the housing or housing cover and the pulley or sheave 3 no longer represents a critical value for ensuring an adequate pumping out or draining of the dam or baffle body since the coupling fluid is pumped off via the dam or baffle body 13 from the channel 12.

Figure 2:
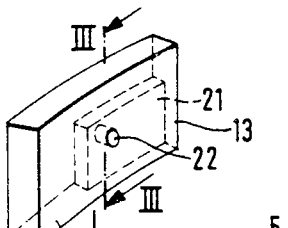
FIG. 2 is a partial cross sectional perspective view of the hydraulic coupling of FIG. 1 in an area of a dam or baffle body constructed in accordance with the present invention.

As shown most clearly in FIG. 2, in an area in which the body 13 is inserted into the housing 5, the recess 14 is essentially created by interrupting a collar 23, which collar 23 is created by the replacement or forming of the channel 12. Advantageously, a rear wall 24 of the recess 14 lies in the same plane as the rear wall 19 of the channel 12 so that the rear wall of the body 13 does not need to be separately constructed or designed. The dimensions of the body 13 and recess 14 are matched in such a manner that the dam or baffle body 13 may be securely accommodated in the recess 14 by a close sliding fit, thereby facilitating a replacement or cleaning of the body 13 if the bore 20 should become plugged or the like. The bore 20 is positioned so that, when the dam or baffle body 13 is installed, the opening 22 is located above the partition or dividing wall 9 in an area above the supply chamber 8.

Figure 3:
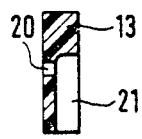
FIG. 3 is a partial cross sectional view taken along the lines III—III in FIG. 2.

As shown most clearly in FIG. 3, a radially outer contour of the recess 21 forming the dam chamber in the body 13 is such that it is ensured that the coupling fluid in the damming chamber is delivered to the bore 20. Depending upon a positioning of the bore 20 in the body 13, the recess 21 may be constructed in such a manner so as to ensure that an adequate volume or amount of the coupling fluid is in front of the bore 20.

Figure 4:
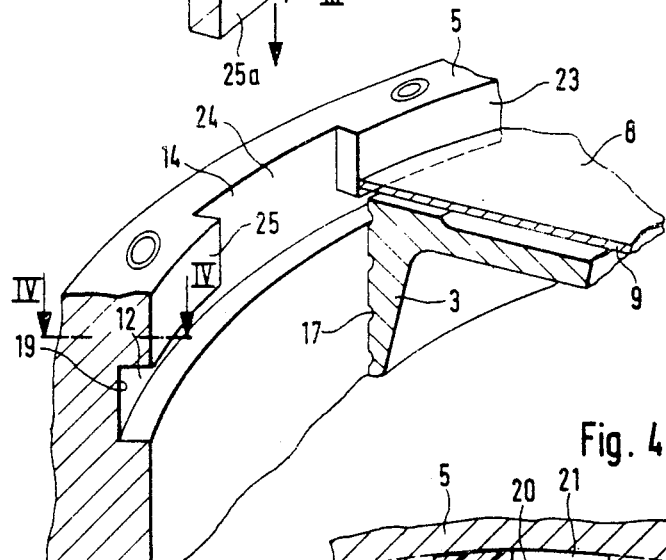
FIG. 4 is a partial cross sectional view taken along the line IV—IV of FIG. 2 with the dam or baffle of the present invention disposed in a secure or mounted position.
Figure 4:
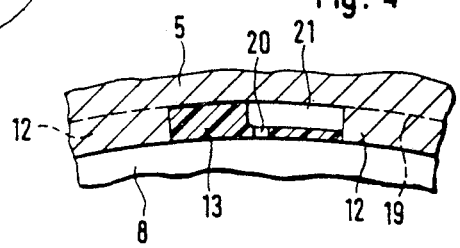

FIG. 4 provides a clear illustration of the circumferential outline or contour of the dam or baffle body 13 in an area of the recess 21. Because of the centrifugal force, the coupling fluid is forced against the wall 19 of the channel 12 and the body 13 stops the rotary motion of the coupling fluid because the fluid enters the recess 21. From the recess 21, as noted above, the coupling fluid moves through the bore 20, opening 22, and return bore 26 into the supply chamber 8.

Figure 5:
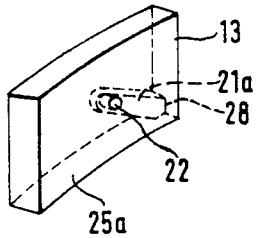
FIG. 5 is a perspective view of another construction of a dam body for a hydraulic coupling constructed in accordance with the present invention.

FIG. 5 provides another example of a dam or baffle body 13 wherein a channel 21a is provided in a radially outer area of the dam body 13, with an inlet opening 28 of the channel 21a being in communication with the channel 12 when the body 13 is secured or mounted at the housing 5. The channel 21a extends diagonally over at least a portion of a radially outer area of the dam or baffle body 13 and terminates in an area of a mouth of the bore 20. Thus, the working fluid is reliably branched off at the channel 12 and fed into the bore 20 and through opening 22 thereof to the supply chamber 8. The dam body 13 is arranged in the same manner as described hereinabove in connection with FIG. 2.

Since the dam or baffle body is not subjected to friction, the body can be manufactured from, for example, a plastic material and, effectively forms a wear-free part. Moreover, since a distance between the face of the sheave or pulley 3 and the cover 6 may be manufactured with larger tolerances than in previously proposed constructions, the overall cost of manufacturing of the pulley or sheave 3 and thus the cost of manufacturing the entire hydraulic coupling may be subtantially reduced.

While I have shown and described only two embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A hydraulic coupling comprising a primary coupling part including a pot-shaped pulley means, and a secondary coupling part including a housing means for housing said pot-shaped pulley means and cover means for covering an opening in said housing means, means for dividing the housing means into a supply chamber means for supplying coupling fluid and working chamber means for receiving coupling fluid from said supply chamber means, means for rotatably supporting the pulley means in the working chamber means, and recyclinng means for enabling a recycling of coupling fluid between the supply chamber means and the working chamber means, said recycling means including circumferentially extending channel means in an interior of the housing means having a width in the axial direction of the coupling which is sufficient to extend over at least a portion of the width of the pulley means for receiving coupling fluid distributed by said working chamber means, the channel means terminating, on the side nearest the cover means in an end wall disposed in a radial plane in which a forward edge of the pulley means is disposed, means in the housing means for pumping out the coupling fluid from the working chamber means into the recycling means, the means for pumping out including baffle means, a radially inner surface disposed along an inner cylinder surface of the housing means and extending in an axial direction from an area above the supply chamber means to an area above the channel means, coupling fluid return means provided in the baffle means and return bore means in the cover means communicating with the coupling fluid return means for returning fluid to said supply chamber means from said working chamber means.

2. A hydraulic coupling according to claim 1, wherein means are provided along an outer circumferential surface of the pulley means for directing the coupling fluid toward the channel means, and recess means are provided in the housing means for accommodating the baffle means.

3. A hydraulic coupling according to claim 2, wherein the recess means have a circumferential length corresponding to a circumferential length of the baffle means.

4. A hydraulic coupling according to one of claims 2 or 3, wherein means are provided in a radially outer area of the baffle means for receiving and accommodating coupling fluid from the channel means.

5. A hydraulic coupling according to claim 4 wherein the means for receiving and accommodating coupling fluid includes a diagonally extending channel means communicating with the circumferentially extending channel means.

6. A hydraulic coupling according to claim 5 wherein the coupling fluid return means terminates in a discharge opening at a radially inner surface of the baffle means, and the discharge opening is disposed above an inlet of a return bore means when the baffle means is mounted in the housing means.

7. A hydraulic coupling according to claim 6, wherein the coupling fluid return means communicates with the diagonally extending channel means.

8. A hydraulic coupling according to claim 7, wherein a radial width of the baffle means and recess means corresponds to a radial depth of the circumferentially extending channel means.

9. A hydraulic coupling according to claim 8, wherein the baffle means is formed of a plastic material.

10. A hydraulic coupling according to claim 9, wherein the means for directing the coupling fluid to the channel means includes a spiral groove means provided along the outer circumference of the pulley means.

11. A hydraulic coupling according to claim 5, wherein the means for receiving and accommodating coupling fluid includes a recess formed in the baffle means, the coupling fluid return means communicates with the recess formed in the baffle means, the recess formed in the baffle extends in a circumferential direction at least up to a mouth of the coupling fluid return means.

12. A hydraulic coupling according to claim 1, wherein recess means are provided in the housing means for accommodating the means for pumping out the coupling fluid, and the recess means has a circumferential length corresponding to a length of the means for pumping out the coupling fluid.

13. A hydraulic coupling according to one of claims 1 or 12, wherein means are provided in a radially outer area of the means for pumping out the coupling fluid for receiving and accommodating the coupling fluid from the circumferential channel means.

14. A hydraulic coupling according to claim 13, wherein the means for receiving and accommodating includes a recess formed in the means for pumping out the coupling fluid, and the recycling means communicates with the recess.

15. A hydraulic coupling according to claim 14, wherein the coupling fluid return means terminates in a discharge opening at a radially outer surface of the means for pumping out the coupling fluid, and the discharge opening is disposed above an inlet of the return bore means.

16. A hydraulic coupling according to claim 15, wherein the coupling fluid return means communicates with the recess.

17. A hydraulic coupling according to claim 13, wherein the means for receiving and accommodating includes a diagonally extending channel means communicating with the circumferentially extending channel means.

18. A hydraulic coupling according to one of claims 1, 2, 3, or 12, wherein the means for pumping out the coupling fluid is formed of a plastic material.

19. A hydraulic coupling according to claim 17, wherein means are provided for directing the coupling fluid to the channel means including a spiral groove means provided along the outer circumference of the pulley means.

20. A hydraulic coupling comprising a primary coupling part including a pot-shaped pulley means, and a secondary coupling part including a housing means and a cover means, means for dividing the housing means into a supply chamber means for coupling fluid and a working chamber means, means for rotatably supporting the pulley means in the working chamber means, and recycling means for enabling a recycling of coupling fluid between the supply chamber means and the working chamber means, characterized in that circumferentially extending channel means are provided in an interior of the housing means, the channel means having a width in the axial direction of the coupling which is sufficient to extend over at least a portion of the width of the pulley means, the channel means terminating, on the side nearest the cover means, in an end wall disposed in a radialy plane in which a forward edge of the pulley means is disposed, means in the housing means for pumping out the coupling fluid from the working chamber means into the recycling means, and in that the means for pumping out includes baffle means and a radially inner surface disposed along an inner cylindrical surface of the housing means and extending in an axial direction from an area above the supply chamber means to an area above the channel means, said recycling means includes a coupling fluid return means provided in the baffle means, means are provided along an outer circumferential surface of the pulley means for directing the coupling fluid toward the channel means, recess means are provided in the housing means for accommodating the baffle means, return bore means are provided in the cover means communicating with the coupling fluid return means, and in that means are provided in a radially outer area of the baffle means for receiving and accommodating coupling fluid from the channel means.

* * * * *